(12) United States Patent
Mahyari

(10) Patent No.: US 6,414,274 B1
(45) Date of Patent: Jul. 2, 2002

(54) ELECTRICAL HEATER LID

(76) Inventor: Afsaneh Mahyari, #1204 - 110 West 4th Street, North Vancouver B.C. (CA), V7M 3H3

( * ) Notice: Subject to any disclaimer, the term of this patent is extended or adjusted under 35 U.S.C. 154(b) by 0 days.

(21) Appl. No.: 09/945,877

(22) Filed: Sep. 5, 2001

(51) Int. Cl.[7] .............................. A47J 27/02; A47J 36/06
(52) U.S. Cl. ...................... 219/386; 219/438; 219/442; 392/409; 392/416; 392/432
(58) Field of Search .................................. 219/386, 409, 219/411, 438, 442, 443.1, 452.13; 392/409, 416, 432, 435; 99/340, 339, 376

(56) References Cited

U.S. PATENT DOCUMENTS

| | | | | | |
|---|---|---|---|---|---|
| 1,969,878 A | * | 8/1934 | Dumas | ........................ | 219/438 |
| 1,992,843 A | * | 2/1935 | Serenberg et al. | ...... | 219/452.13 |
| 2,497,241 A | * | 2/1950 | Spigel | .................... | 219/452.13 |
| 2,538,567 A | * | 1/1951 | Jones | .................... | 219/452.13 |
| 2,675,458 A | * | 4/1954 | Stiles | .................... | 219/452.13 |
| 3,243,576 A | * | 3/1966 | Lee et al. | ................... | 219/386 |
| 3,410,981 A | * | 11/1968 | Martin | ........................ | 219/386 |
| 3,596,590 A | * | 8/1971 | Harris | ........................ | 99/372 |
| 3,850,331 A | * | 11/1974 | Oxel | ........................... | 99/340 |
| 5,586,488 A | * | 12/1996 | Liu | .............................. | 99/331 |
| 6,170,388 B1 | * | 1/2001 | Shovick | ....................... | 99/331 |
| 6,288,369 B1 | * | 9/2001 | Sherman | ...................... | 219/411 |

* cited by examiner

*Primary Examiner*—Joseph Pelham

(57) ABSTRACT

The Electrical Heater Lid is a cover-type food cooking and warming apparatus that provides surface cooking by evenly passing intense heat over the food being cooked in a pot, pan, or skillet. Many foods require surface heat to eliminate flipping the food over in the utensil. Such foods are cooked better and more quickly if both sides of the food can be cooked simultaneously, and the invention is directed toward such foodstuff. The apparatus fits on and covers the top of various sizes of pots, pans, or skillets for broiling, cooking, heating, sealing the surface of food products, and helping steaming process of steamed rice. The apparatus includes a metal curved cover lid, a heat resistant barrier, the electrical resistance heating elements, and a highly heat conductive bottom covering panel, a steam vent via a knob that incorporates a rotatable member to permit the vapor to escape, a removable long hollow handle which incorporates the electrical devices and transmits power from the electrical power source to the heating elements within the lid and a cross handle attached the lid for easy lifting. Moreover, for safety purposes a heat resistant four-legged tray is provided for placing the electrical heater lid on it whenever it is not being used.

5 Claims, 4 Drawing Sheets

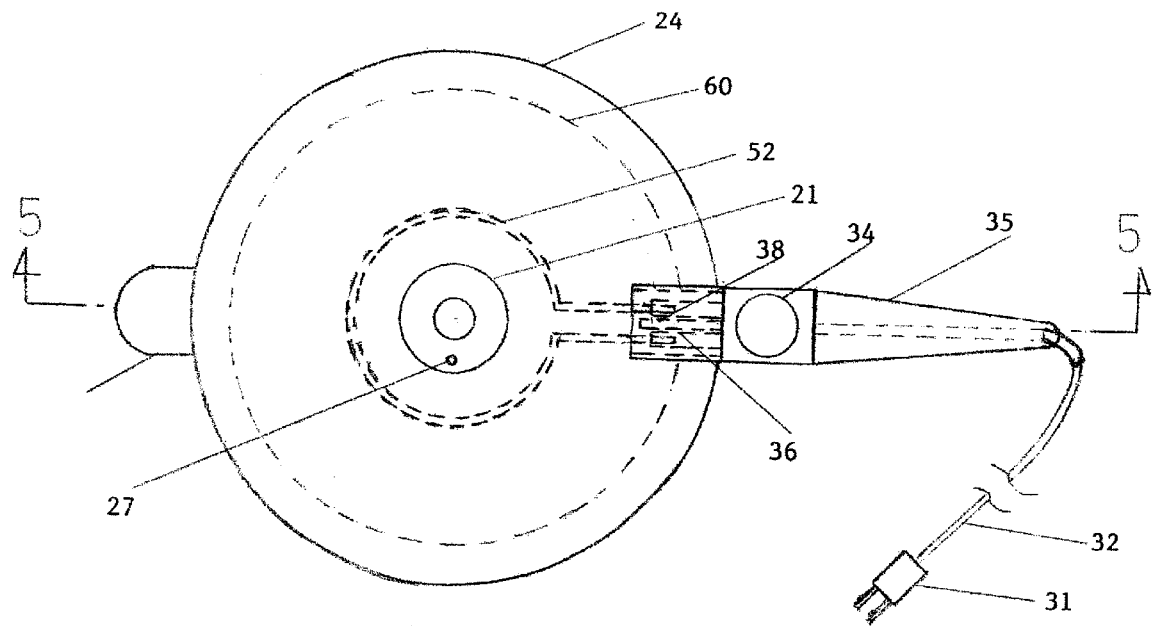
FIG. 4
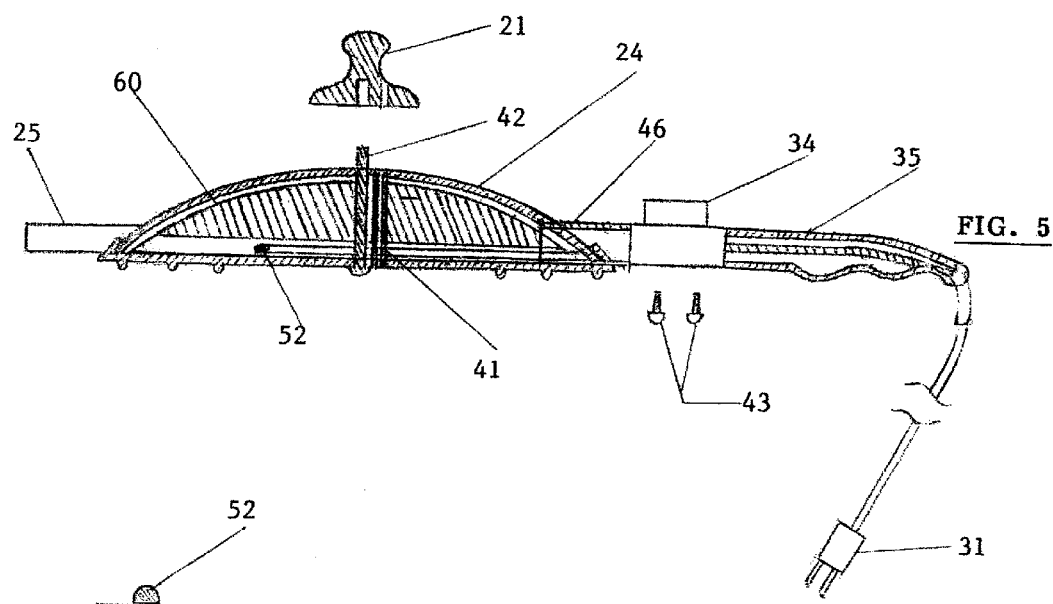
FIG. 5
FIG. 8

ELECTRICAL HEATER LID

BACKGROUND OF THE INVENTION

1. Field of the Invention

This invention relates generally to an apparatus lid having a broiler type heater element for broiling, cooking the surface of the food, and also providing simultaneous cooking by placing the apparatus of the invention on top of a pot, pan, or skillet in which the food is being heated or cooked without having to turn it over in the cooking vessel.

2. Description of the Prior Art

Many foods require surface heat to eliminate flipping the food over in a utensil. Such foods are cooked better and more quickly if both sides of the food can be cooked simultaneously. This invention is directed towards such foodstuffs and will be described with particular reference to Omelets that are difficult to turn over for fraying on both sides without damaging the structure or appearance of the food. However it will be apparent to one skilled in the art that foods such as Pancakes, Crepes, Cakes and Pizzas can also be cooked in a pot, pan, or skillet by placing the apparatus of the invention on top of the utensil while its bottom is being heated.

Traditionally one uses large oven that takes a substantial period of time to warm up and significant amount of energy both in warming up and maintaining a given temperature. They are therefore expensive to run and inefficient in use of energy for cooking or heating relatively small materials.

Sandwich maker U.S. Pat. No. 5,473,976 is known in which there is a heating element in both the top and the bottom component of the cooking apparatus. They are designed so that there is no space between the top and bottom surface; therefore, it is not useful to cook different food, with different thickness in it.

Personal cooking apparatus U.S. Pat. No. 5,615,604 is invented similar to the electrical toasted sandwich including space between the top and bottom surface to cook different food; however, it does not solve the problem of cooking in a pot, pan, or skillet, needing the top heat to cook the surface of food for speeding up the cooking process, and eliminating of flipping the food over.

Cooking utensil U.S. Pat. No. 3,596,590 is invented that is a cover-type cooking utensil whereby hot vapors such as steam is formed which cooks the side of the food facing the cover at the same time as the food facing the heated surface is being cooked as they refer to frying eggs. However, it is not practical or useful and does not provide enough heat to cook the surface of different kinds of food with different thickness and also it does not broil those foods.

Accordingly, there is a need for a cover-type cooking apparatus that provides enough heat to broil and cook the top surface of food being cooked in a pot, pan, or skillet and to provide simultaneously cooking condition when it is needed.

Various efforts have been made to construct a cooking utensil for broiling, sealing the surface of food and simultaneous cooking the food on both of its sides without having to turn the food over in the cooking vessel. However, no practical utensil has been previously provided which is portable and permits a variety of functions as the electrical heater lid does.

SUMMARY OF THE INVENTIION

Present invention provides a new portable cooking apparatus for broiling, cooking, heating, helping the steaming process of steamed rice, sealing the surface of food products by easily placing the electrical heater lid over the pot, pan, or skillet in which the food is being heated. By using the apparatus of this invention there is no need for turning the food over whereby damage to the appearance of food will be eliminated.

It is therefore an object of the present invention to provide a cover-type portable cooking and warming apparatus that is convenient to use and provides surface cooking of food with different thickness by evenly passing intense heat over the item being cooked in a vessel and reduces the cooking time and minimizes uneven cooking.

This energy efficient apparatus eliminates the use of broiling oven that takes a substantial period of time to warm up. The foregoing oven also uses a significant amount of energy, both in warming up and maintaining a given temperature. They are therefore expensive to run and inefficient in use of energy.

BRIEF DESCRIPTION OF THE DRAWIINGS

The invention will be better understood and become apparent when consideration is given to the following detailed description thereof. Such description makes reference to the annexed drawings wherein:

FIG. 4 is a top plan view of the present invention.

FIG. 5 is a cross-sectional view taken on the line 5—5 of FIG. 4.

FIG. 8 is a cross-sectional view of the element sitting on the bottom panel of the present invention.

DESCRIPTION OF THE PREFERRED EMBODIMENT

Figure 1:
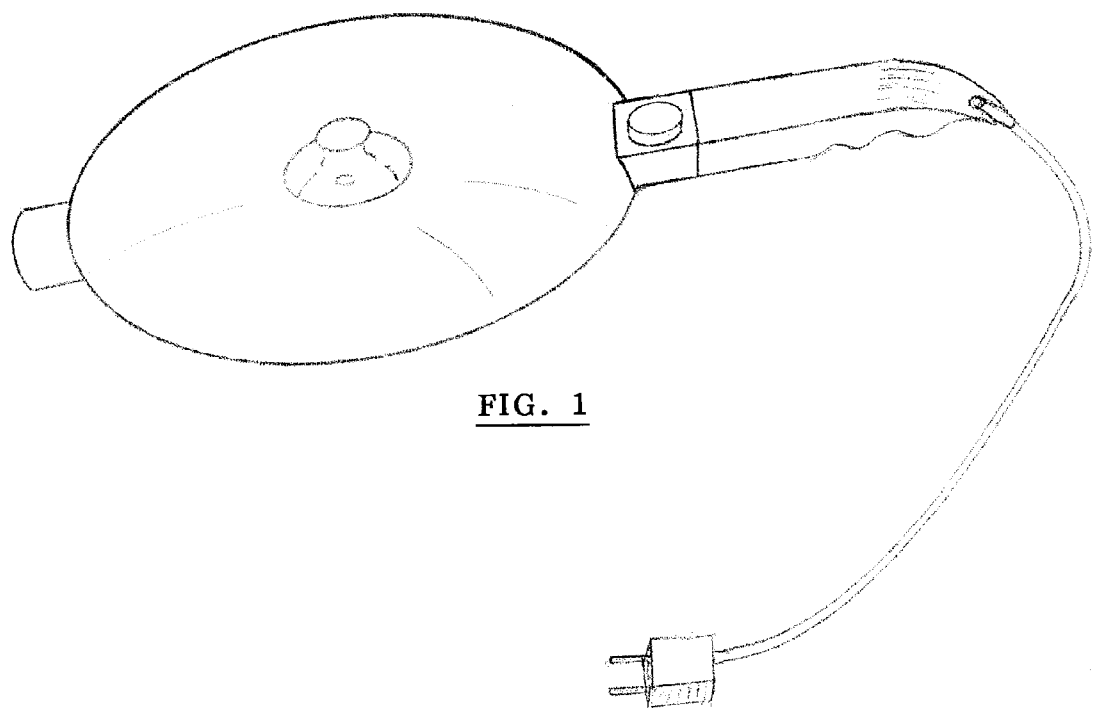
FIG. 1 is a perspective view of a preferred embodiment of the Electrical Heater Lid apparatus according to the present invention.
Figure 2:
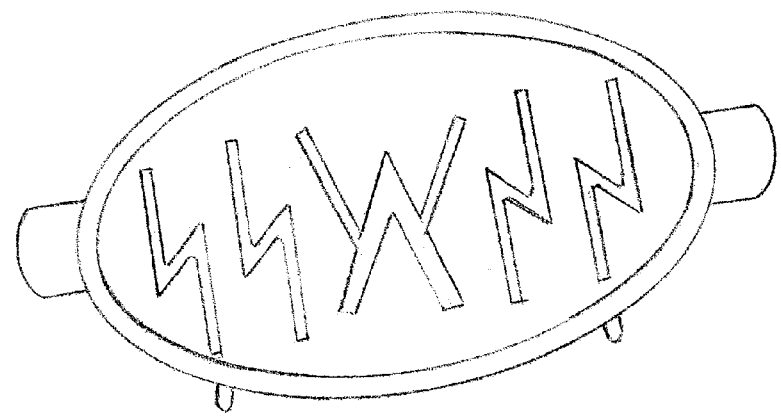
FIG. 2 is a perspective view of the four-legged tray to place the apparatus of the invention on it while it is not being used.

With reference now to the drawings, and in particular to FIGS. 1 through 8 thereof, the electrical heater lid embodying the principles and concepts of the present invention and generally designated by the reference numeral 10 will be described.

Figure 3:
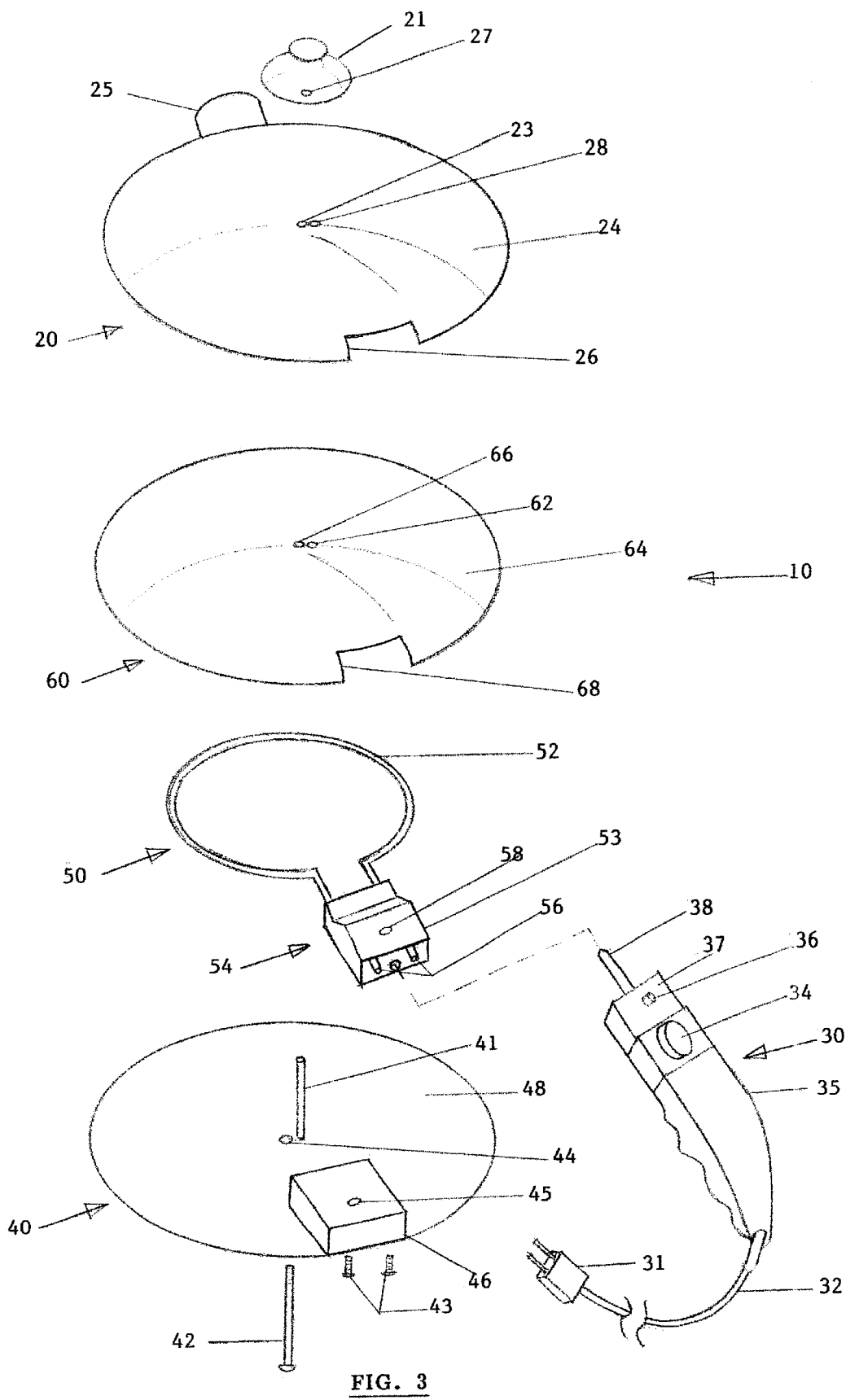
FIG. 3 is an exploded perspective view of the apparatus of FIG. 1.
Figure 6:
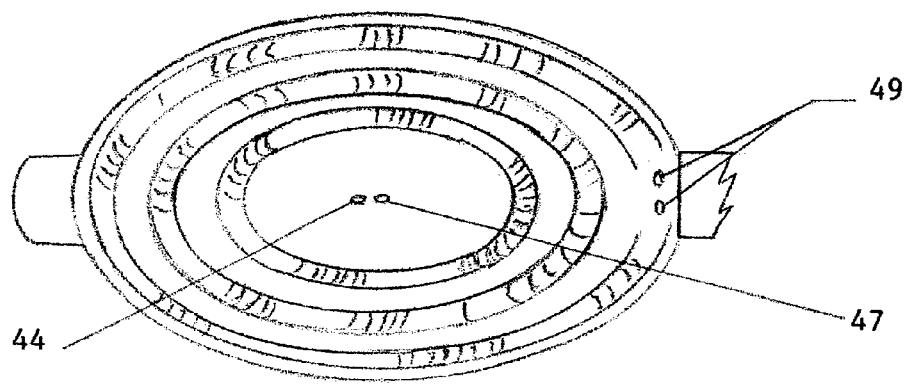
FIG. 6 is a bottom perspective view of bottom panel.
Figure 7:
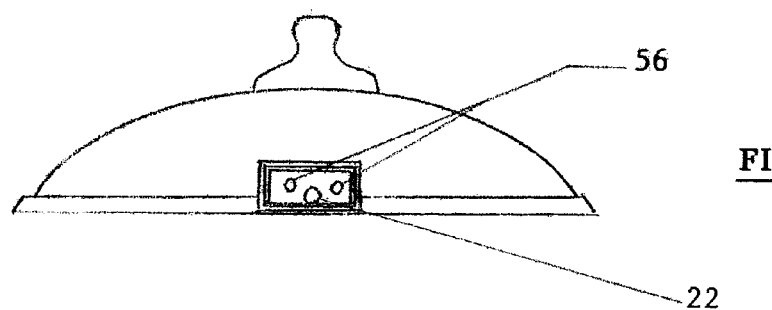
FIG. 7 is a right perspective view thereof.

As best illustrated in FIGS. 3 through 8, the cooking device 10 generally comprises a bottom panel 40 as shown in FIG. 3, including a bottom panel 48 made of a highly heat conductive metal which has two sides: its top side is flat as per FIG. 3 and its bottom side is concavely having three circular concaved edges as shown in FIG. 6. These three concaved edges are provided to sit fit on top of the round cooking vessels ranging from 8 to 12 inches in diameter as shown in FIG. 6. Also, as per FIG. 6, two holes are provided within the bottom panel 48: hole 44 is located within its center and hole 47 hereby called the eccentric hole is located slightly away from the center and very close to hole 44. A steam vent pipe 41 is axially in-lined with the center point of hole 47 and perpendicularly welded to the flat side of the bottom panel 48. Also, a power insertion housing 46 is securely welded to the flat side of the bottom panel 48.

The heating unit 50 includes a heating element 52 which is formed generally in circular fashion and is of conventional construction with an electrical resistance element surrounded by a heat conductive but electrical resistant material. The ends of the heating element, and particularly its electrical resistance element terminate, in electrical contacts 56 in an electrical plug receptacle 54. This plug receptacle 54 includes a housing 53 which is inserted in the power insertion housing 46 and fastened to it by two screws 43 passing through holes 49 from the bottom of the bottom panel 48. The remainder of the plug receptacle 54 is similar to conventional plug receptacles that are used with this type of heating element. As shown in FIG. 5, element 52 is somewhat semi-circular in cross-section and its flat side 51 sits firmly on the surface of the bottom panel 48 in order to transfer maximum heat through this panel. FIG. 8 shows the cross-sectional view of the contact between element 52 and bottom panel 48. The round surface of the element 52 can be coated, for example with a silicone rubber, to reduce the heat dissipated from that area of the element.

The embodiment 60 is to prevent the lid surface being heated which is a heat resistant barrier 64 that has a central hole 66 for the machine bolt 42 to pass through it and an eccentric hole 62 that is for the steam vent pipe to pass through. Also heat resistant barrier 64 has a cut 68 that fits exactly on top of the power insertion housing 46.

The embodiment 20 includes a curved lid cover 24 which is made either of a sheet metal preferably of the stainless steel or of the aluminum core sheathed with stainless steel. A lifting mean such as a side handle 25 is attached to the left side of the foregoing lid. Also, a cut 26 is provided to the lid in order to facilitate its sitting tightly over the electrical housing 46. The hole 28 is provided in-line with holes 62 and 47, allowing the steam vent pipe 41 passes through them and be terminated and welded to the hole 28. The hole 23 is located in the center of the curved lid cover 24 and is suitable to let the machine bolt 42 passes through it. Knob 21 acts as a lock nut for the machine bolt 42. Also, a rotatable member is incorporated in the said knob to permit the vapor generated during the cooking to escape.

The removable electrical handle embodiment 30 includes an electrical plug 31, fire-proof power cord 32 passing through a long hallow handle 35 to keep the electrical cord away from the heat and flame, a thermostat switch 34 to control the temperature, and a variable resistor 33 to set the flowing current to the heating elements, an electrical insertion plug with a mechanical guide 38 attached to an electrical plug receptacle 37 that has a pop up pin 36 to pass through the holes 58 and 45 to secure the handle in the electrical housing 53. By attaching the electrical handle to the lid plug receptacles 29 and inserting the mechanical guide 38 into its hole 22 in FIG. 7 and connecting the power cord plug 31 to the electrical outlet, the Electrical Heater Lid is ready to function by setting a temperature provided on the thermostat switch.

With respect to the above description then, It is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What I claim as my invention is:

1. An electrical heater lid comprising:

a bottom covering panel made of a highly heat conductive metal with a center hole, an eccentric hole and a power insertion housing welded on its flat side and concaved edges on the other side to fit on different sizes of cooking utensils;

an electrically insulated heating element of a generally semi circular cross-section including a flat bottom surface portion for contacting the top of said bottom covering panels, said element adapted to be connected to the an electrical source;

a heat barrier insulation placed on top of said electrically insulated heating element to prevent heat to penetrate to the top, comprising two holes which are axially in-lined with said holes specified in said bottom covering panel;

a top curved metallic lid which is placed on top of said heat barrier insulation comprising two holes axially in-line with said holes of said bottom covering panel;

a machine bolt inserted from said center hole of said bottom covering panel, through said center hole of said heat barrier insulation and said center hole of said top curved lid;

a steam vent knob with a lock nut which incorporates a rotatable member to permit the vapor to escape, placed on top of said top curved lid, bolted to said machine bolt's threaded end, keeping intact all parts including said bottom covering panel, electrically insulated heating element, heat barrier insulation and top curved lid;

a vent pipe welded axially in-line to said eccentric hole on the flat side of said bottom covering panel which is also welded to said eccentric hole of said top curved lid, to permit moisture generated during use of this electrical heater lid, to escape;

a removable long hollow handle mechanically attached to said top curved lid via a combination of a variable resistor and a thermostat switch, comprising a fireproof power cord suitable to be hooked up to the power source via a receptacle from one end and connected to said combination of said variable resistor and thermostat switch from the other end which in turn, provides a preset controlled power to said electrically insulated heating element;

a lifting handle attached to the side of said top curved metallic lid across the said removable hollow handle.

2. An electrical heater lid as set forth in claim 1 wherein the removable hollow handle comprising: a mechanically guided electrical insertion plug, incorporating a pop up pin on the receptacle housing, a variable resistor, a thermostat switch, and a fire-proof power cord suitable to be hooked up to the power source via a receptacle from one end and connected to said combination of said variable resistor and thermostat switch from the other end, passing through a long hallow handle to keep the power cord away from the direct heat.

3. An electrical heater lid as set forth in claim 1 wherein said bottom panel formed of highly heat conductive metal which has three concave edges to securely fit on top of standard size cooking utensils from 8 to 12 inches in diameter.

4. An electrical heater lid as set forth in claim 1 accompanied by a four-legged heat resistant tray for safety purposes to hold the electrical heater lid on its top whenever said electrical heater lid is not being used.

5. An electrical heater lid as set forth in claim 3 will be enlarged and/or reshaped for different utensils.

* * * * *